(United States Patent Office)

3,560,230
Patented Feb. 2, 1971

3,560,230
SET RETARDED PORTLAND CEMENT
COMPOSITION
Robert W. Previte, Lawrence, Mass., assignor to W. R.
Grace & Co., Cambridge, Mass.
Filed Jan. 8, 1969, Ser. No. 789,969
Int. Cl. C04b 13/26
U.S. Cl. 106—90     4 Claims

ABSTRACT OF THE DISCLOSURE

The setting time of hydraulic cement compositions (e.g. portland cement concrete)) is retarded by the addition of N,N-dimethyloldihydroxyethyleneurea to the composition.

This invention relates to additives for hydraulic cement compositions. More particularly, this invention concerns additives for concrete, mortar and neat paste compositions prepared from hydraulic cement, which additives are effective in retarding the setting time of such compositions.

Numerous materials have conventionally been incorporated in hydraulic cement compositions to delay the set of the composition. Preventing early setting of, for example, portland cement concrete used in building construction becomes especially important when the construction is to take place during hot weather since the setting of the concrete is accelerated to a point where it is difficult to work the concrete properly before it is set. Preventing rapid setting of portland cement concrete is also of concern in the construction of large structures of concrete where it would be undesirable to have the portion of the concrete poured initially set before the remainder of the concrete has been poured.

Such set-retarding materials function in the portland cement by altering the rate of hydration of the tricalcium silicate ($C_3S$) component of the cement. Unlike the tricalcium aluminate ($C_3A$) component of the cement, the tricalcium silicate component is slow to hydrate and does not undergo any appreciable reaction with water until after a period of 2 to 6 hours following the addition of the water. The rate of hydration of the $C_3A$ is controlled by intergrinding calcium sulfate with the clinker. If calcium sulfate were not present, the cement would undergo flash set. When a set-retarding material is present, it is adsorbed by the $C_3S$ and its hydration products, and this slows down the further hydration of the $C_3S$. As a result, the setting time of the cement composition is delayed.

Quite often the materials employed to retard setting of hydraulic cement compositions, while effective for that purpose, additionally effect certain undesirable results such as decreasing the compressive strength of the set composition or accomplishing an undesirable high degree of air entrainment. Further, some of the conventionally employ set retarders function only in specific types of cements.

It has now been found that the initial set of hydraulic cement compositions such as portland cement concrete, mortar and neat paste can be effectively retarded without any of the accompanying aforementioned undesirable effects by the incorporation of a small amount of N,N-dimethyloldihydroxyethyleneurea in the composition. Further, the compound appears to be effective in a variety of cements. The present invention thus comprises a novel composition containing an hydraulic cement and at least a set-retarding amount of N,N-dimethylol-dihydroxyethyleneurea. This compound is the reaction product of urea, glyoxal and formaldehyde, its reported structural formula being:

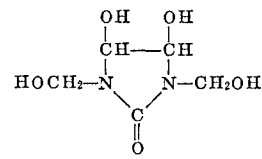

The compound can be prepared according to the procedure set forth in U.S. Pat. 3,049,446 to Goldstein et al. wherein the compound is prepared by reacting 1 mole of urea, 1 mole of glyoxal and 2 to 2.5 mols of formaldehyde in aqueous solution at a pH of from 4 to 6, a temperature of 25° to 95° C. and from a period of time ranging between 30 minutes and 72 hours. An alternative method for its preparation can be found in British Pat. 720,386.

Since the setting of concrete is influenced to a great extent by temperature, the exact amount of the N,N-dimethylol-dihydroxyethyleneurea in the cement composition may vary according to the temperature at which the cement composition is to be employed and the desired degree of set retardation. In all cases, however, at least an amount of the compound is employed which is sufficient to effect set retardation. Usually the amount of the novel retarder employed will range between 0.01 and 1, preferably between 0.04 and 0.2 percent by weight, based upon the weight, of the hydraulic cement. The set-retarded hydraulic cement composition of the present invention can contain other optional cement additives, for instance, additional set retarders such as lignosulfonic acid and salts thereof, other compressive strength enhances, etc.

The set retarder of the invention can be added to the hydraulic cement at any time but preferably is added in solution along with the water mix.

The following examples further illustrate the present invention and should not be considered limiting.

EXAMPLE I

Several mortar mixes were prepared according to ASTM C-403-68 procedures, using various types of portland cement manufactured by different suppliers and containing, in varying amounts, N,N-dimethylol-dihydroxyethyleneurea. The mixes were tested for set retardation by comparison of their initial and final setting times with the setting times of identical mixes which contained no additive. For purposes of comparing the degree of set retardation obtained, additional mixes were tested which contained a commercial set retarder. The results are shown in Table I.

TABLE I

| | | Portland cement mortar mix [1] | | | | | | | |
|---|---|---|---|---|---|---|---|---|---|
| | | Type I portland cement | | | | | | Type III portland cement | |
| | | Supplier II | | | | Supplier III | | | |
| Additive | Amount added (percent) | Initial [2] set, hrs.:min. | Final [3] set, hrs.:min. | Initial set, hrs.:min. | Final set, hrs.:min. | Initial set, hrs.:min. | Final set, hrs.:min. | Initial set, hrs.:min. | Final set, hrs.:min. |
| Blank | | 4:45 | 6:50 | 5:30 | 6:50 | 4:45 | 6:10 | 5:05 | 6:55 |
| Commercial retarder | 0.24 | 5:40 | 7:35 | | | | | 5:40 | 7:25 |
| N,N,dimethyloldihydroxyethyleneurea | 0.01 | | | | | 5:05 | 6:50 | | |
| | 0.06 | 6:15 | 8:00 | 6:35 | 8:30 | 5:30 | 7:20 | | |
| | 0.08 | | | | | 6:40 | 8:30 | | |
| | 0.09 | | | | | | | 6:55 | 8:40 |

[1] Prepared according to ASTM C-403-68.
[2] Indicates the length of time expired before initial set.
[3] Indicates the length of time expired before final set.

EXAMPLE II

Several concrete mixes were prepared according to ASTM C-494-68 specifications, using various types of portland cement obtained from different suppliers and containing, in varying amounts, the retarder of the invention. The resulting concretes were tested for compressive strength according to ASTM C39-66 test procedure and the results compared with concretes prepared from identical mixes which contained no additive. As in Example I, tests were made on compositions containing the commercial set retarder for comparison. The results are reported in Table II.

It is claimed:

1. A composition consisting essentially of a portland cement and a set retarding amount of N,N-dimethyloldihydroxyethyleneurea.

2. The composition of claim 1 wherein the amount of N,N-dimethyloldihydroxyethyleneurea is from about 0.01 to 1 percent by weight based upon the weight of said cement.

3. A concrete mix comprising portland cement and about 0.01 to 1 percent by weight, based upon the weight of said cement, of N,N-dimethyloldihydroxyethyleneurea.

TABLE II

| | | | | | Portland cement concrete [1] | | | | | | | | | | |
|---|---|---|---|---|---|---|---|---|---|---|---|---|---|---|---|
| | | | | | Type I portland ements | | | | | | Type II portland cement, compressive strength (p.s.i.) | | | Type III portland cement, compressive strength (p.s.i.) | | |
| | | | | | Supplier I, compressive strength (p.s.i.) | | | Supplier II compressive strength (p.s.i.) | | | | | | | | |
| Additive | Amount percent | W/C | Slump | Percent air | 1 day | 7 day | 28 day | 1 day | 7 day | 28 day | 1 day | 11 day | 28 day | 1 day | 7 day | 28 day |
| Blank | | 0.644 | 4¼" | 2.1 | 1,321 | 3,609 | 5,142 | | | | | | | | | |
| | | 0.637 | 4¾" | | | | | 824 | 3,677 | 4,791 | | | | | | |
| | | 0.606 | 4½" | | | | | | | | 939 | 3,872 | 5,240 | | | |
| | | 0.650 | 4¾" | | | | | | | | | | | 1,293 | 4,958 | 5,535 |
| Commercial retarder | 0.24 | 0.594 | 4½" | | | | | 875 | 4,138 | 5,483 | | | | | | |
| | | 0.616 | 4½" | | | | | | | | | | | 975 | 4,958 | 5,742 |
| N,N,dimethylol dihydroxyethyleneurea | 0.06 | 0.625 | 4½" | 2.3 | 1,608 | 4,038 | 5,332 | | | | | | | | | |
| | | 0.625 | 5" | | | | | 871 | 4,277 | 5,217 | | | | | | |
| | | 0.594 | 4¾" | | | | | | | | 1,134 | 4,270 | 5,686 | | | |
| | 0.09 | 0.640 | 4¾" | | | | | | | | | | | 923 | 5,479 | 5,786 |

[1] Prepared according to ASTM C-494-68 mix—5.5 SKS/yd.

An examination of the data in Type I shows the effectiveness of the N,N-dimethyloldihydroxyethyleneurea as a set retarder in various types of cement. Moreover, the compound was superior in retardation effect to the commercial set retarder even though the amount employed was as little as one quarter the amount of the commercial set retarder used.

The data presented in Table II demonstrate the enhancement of compressive strength of various types of concrete obtained using the set retarder of the invention in the mix. Again, the N,N-dimethyloldihydroxyethyleneurea was superior to the commercial retarder in this respect even though employed at a far less concentration. Further, the data shows that the retarder of the invention can be employed without significantly increasing the amount of air entrained in the concrete.

4. The mix of claim 3 wherein the amount of the dihydroxyethyleneurea ranges between about 0.04 and 0.2 percent by weight.

References Cited

UNITED STATES PATENTS

| 2,152,670 | 4/1939 | Shutt | 106—90 |
| 3,216,966 | 11/1965 | Collins et al. | 106—90 |
| 3,365,319 | 1/1968 | Link | 106—90 |
| 3,420,687 | 1/1969 | Serafin | 106—90 |

TOBIAS E. LEVOW, Primary Examiner

W. T. SCOTT, Assistant Examiner

U.S. Cl. X.R.

106—314, 315; 260—309.7